(12) United States Patent
Liu et al.

(10) Patent No.: US 9,906,310 B2
(45) Date of Patent: Feb. 27, 2018

(54) SIGNAL RECEIVING METHOD AND RECEIVER

(71) Applicant: HUAWEI TECHNOLOGIES CO., LTD., Shenzhen (CN)

(72) Inventors: Ling Liu, Shenzhen (CN); Liangchuan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/338,944

(22) Filed: Oct. 31, 2016

(65) Prior Publication Data

US 2017/0048004 A1    Feb. 16, 2017

Related U.S. Application Data

(63) Continuation of application No. PCT/CN2014/076497, filed on Apr. 29, 2014.

(51) Int. Cl.
| | |
|---|---|
| *H04B 10/06* | (2006.01) |
| *H04B 10/69* | (2013.01) |
| *H04J 14/02* | (2006.01) |
| *H04J 14/06* | (2006.01) |
| *H04L 25/03* | (2006.01) |

(52) U.S. Cl.
CPC ......... *H04B 10/6972* (2013.01); *H04J 14/02* (2013.01); *H04J 14/06* (2013.01); *H04L 25/03299* (2013.01); *H04L 25/03993* (2013.01)

(58) Field of Classification Search
CPC ............ H04B 10/6162; H04B 10/6163; H04B 10/6164; H04B 10/613; H04B 10/614; H04B 10/616; H04B 10/6971; H04B 10/6972

USPC ....... 398/202, 204, 205, 206, 207, 208, 209, 398/183, 188, 184, 65, 152, 158, 159, 33,
(Continued)

(56) References Cited

U.S. PATENT DOCUMENTS 6,426,983 B1 * 7/2002 Rakib .................. H04B 1/7102
375/346
6,590,932 B1    7/2003 Hui
(Continued)

FOREIGN PATENT DOCUMENTS

| CN | 1399835 | 2/2003 |
|---|---|---|
| CN | 1555640 | 12/2004 |

(Continued)

OTHER PUBLICATIONS

International Search Report dated Jan. 30, 2015 in corresponding International Application No. PCT/CN2014/076497.
(Continued)

*Primary Examiner* — Hanh Phan
(74) *Attorney, Agent, or Firm* — Staas & Halsey LLP

(57) ABSTRACT

Embodiments of the present invention provide a signal receiving method and a receiver. The signal receiving method includes: sequentially preprocessing a received first signal to obtain to-be-processed second signals; generating filtering coefficients for the second signals by converting colored noise of the second signals into white noise; and filtering the corresponding second signals according to the filtering coefficients. Filtering can be performed according to different channel conditions and transmission requirements, thereby improving system performance of the receiver.

17 Claims, 5 Drawing Sheets

(58) Field of Classification Search
USPC .......... 398/25, 135, 136; 375/148, 152, 350, 375/142, 348, 343, 232
See application file for complete search history.

(56) References Cited

U.S. PATENT DOCUMENTS

| | | | |
|---|---|---|---|
| 6,608,873 | B1 | 8/2003 | Spinnler et al. |
| 6,647,070 | B1 | 11/2003 | Shalvi et al. |
| 2003/0063596 | A1 | 4/2003 | Arslan et al. |
| 2003/0099208 | A1 | 5/2003 | Graziano et al. |
| 2004/0017846 | A1* | 1/2004 | Fernandez-Corbaton ............ H04B 1/7093 375/152 |
| 2005/0079826 | A1 | 4/2005 | He |
| 2014/0086594 | A1* | 3/2014 | Xie .................... H04B 10/6161 398/208 |
| 2016/0204961 | A1 | 7/2016 | Li et al. |

FOREIGN PATENT DOCUMENTS

| | | |
|---|---|---|
| CN | 1669238 | 9/2005 |
| CN | 1868185 | 11/2006 |
| EP | 2495921 | 9/2012 |
| WO | WO0139448 | 5/2001 |

OTHER PUBLICATIONS

International Search Report, dated Jan. 30, 2015, in International Application No. PCT/CN2014/076497 (5 pp.).

Written Opinion of the International Searching Authority, dated Jan. 30, 2015, in International Application No. PCT/CN2014/076497 (8 pp.).

Extended European Search Report, dated Mar. 23, 2017, in European Application No. 14890569.8 (8 pp.).

Forney, Jr., G. et al., *Maximum-Likelihood Sequence Estimation of Digital Sequences the Presence of Intersymbol Interference*, IEEE Transactions on Information Theory, vol. IT-18, No. 3, May 1972, pp. 363-378.

Ungerboeck, G., *Adaptive Maximum-Likelihood Receiver for Carrier-Modulated Data-Transmission Systems*, IEEE Transactions on Communications, vol. COM-22, No. 5, May 1974, pp. 624-636.

Cai, Y., *MAP Detection for Linear and Nonlinear ISI Mitigation in Long-Haul Coherent Detection Systems*, IEEE 2010, pp. 42-43.

Cai, J. et al., *Transmission of 96×100G Pre-Filtered PDM-RZ-QPSK Channels with 300% Spectral Efficiency over 10,608km and 400% Spectral Efficiency over 4,368km*, Optical Fiber Communication Conference, OSA Technical Digest (CD) (Optical Society of America, 2010), paper PDPB10, (3 pp.).

Cai, J. et al., *Transmission of 96 100xGb/s Bandwidth-Constrained PDM-RZ-QPSK Channels With 300% Spectral Efficiency Over 10610 km and 400% Spectral Efficiency Over 4370 km*, Journal of Lightwave Technology, vol. 29, No. 4, Feb. 15, 2011, pp. 491-498.

Li, J., et al., *Approaching Nyquist Limit in WDM Systems by Low-Complexity Receiver-Side Duobinary Shaping*, Journal of Lightwave Technology, vol. 30, No. 11, Jun. 1, 2012, pp. 1664-1676.

* cited by examiner

SIGNAL RECEIVING METHOD AND RECEIVER

CROSS-REFERENCE TO RELATED APPLICATIONS

This application is a continuation of International Application No. PCT/CN2014/076497, filed on Apr. 29, 2014, the disclosure of which is hereby incorporated by reference in its entirety.

TECHNICAL FIELD

Embodiments of the present invention relate to the field of communications technologies, and in particular, to a signal receiving method and a receiver.

BACKGROUND

Multiple transmitters generate multiple polarization multiplexing signals at a given frequency interval, and the polarization multiplexing signals are combined by a combiner to generate a wavelength division multiplexing signal, and the wavelength division multiplexing signal is transmitted to a receiver by using an optical fiber system. The receiver receives the wavelength division multiplexing signal by means of polarization multiplexing coherent reception, uses a demultiplexer to demultiplex the wavelength division multiplexing signal to obtain a signal of a current channel, then uses a polarization splitter to split the signal into two signals, X/Y signals, respectively inputs the X/Y signals to two 90-degree mixers, and moves the signal to a baseband by beating with a local laser signal. Electrical signals received by using four photoelectric detectors pass through four analog-to-digital converters to obtain four digital signals, respectively marked as XI, XQ, YI, and YQ. Finally, the four digital signals are processed by a digital signal processing chip of the receiver to restore data.

In the communications field, with improvement of a system baud rate, bandwidth occupied by a signal carrier is becoming larger. Therefore, when bandwidth of hardware of a transmitter and a receiver is insufficient, a signal loss occurs when a signal passes through the transmitter or the receiver, affecting overall system performance. For a wavelength division multiplexing system, signals are generally loaded on multiple single carriers that are at a fixed interval, and when the bandwidth of the single-carriers increases, inter-channel interference increases, degrading system performance. To improve receiving performance of a system, a two-tap finite impulse response (Finite Impulse Response, FIR) filter and a two-state maximum likelihood sequence detection (Maximum Likelihood Sequence Detection, MLSD) receiver proposed in pages 1664 to 1676 in the article *Approaching Nyquist Limit in WDM Systems by Low-Complexity Receiver-Side Duobinary Shaping* published in 2012 may be used. Alternatively, a receiver proposed in International Patent Application No. PCT/CN2013/084032 entitled "Methods for Sending and Receiving Signals, Corresponding Device and System" published in 2013 may be used, to improve quality of bandwidth-limited signals received.

There are different channel conditions such as different system bandwidth or different optical signal noise ratios (Optical Signal Noise Ratio, OSNR) and different transmission requirements such as different channel interval requirements of a wavelength division multiplexing (Wavelength Division Multiplexing, WDM) system, and impact caused by different channel conditions and different transmission requirements cannot be eliminated when data is restored from signals processed by the digital signal processing chip. Therefore, if a receiving system having a fixed filtering coefficient is used, the system performance of the receiver will be relatively poor due to mismatching.

SUMMARY

Embodiments of the present invention provide a signal receiving method and a receiver, so that filtering can be performed according to different channel conditions and transmission requirements, thereby improving system performance of the receiver.

According to a first aspect of the present invention, a signal receiving method is provided, including:
sequentially preprocessing a received first signal to obtain to-be-processed second signals;
generating filtering coefficients for the second signals by converting colored noise of the second signals into white noise; and
filtering the corresponding second signals according to the filtering coefficients.

In a first possible implementation manner, according to the first aspect, the generating filtering coefficients for the second signals by converting colored noise of the second signals into white noise includes:
if data of the second signals is marked as XI(k), original sending data of the second signals XI(k) is marked as d(k), the colored noise of the second signals XI(k) is marked as n(k), and n(k)=(k)−d(k),
obtaining filtering coefficients $W_0$, $W_1$, $W_2$ ... $W_N$ according to $$\min_{W_0, W_1, W_2 ... W_N} (n(k) = W_0 n(k) - W_1 n(k-1) - W_2 n(k-2) \ldots - W_N n(k-N))^2,$$

where N is a quantity of filter taps, N is a nonnegative integer, and k corresponds to a time serial number of the second signal.

In a second possible implementation manner, according to the first possible implementation manner, the obtaining filtering coefficients $W_0$, $W_1$, $W_2$ ... $W_N$ according to $$\min_{W_0, W_1, W_2, \ldots, W_N} (n(k) - W_0 n(k) - W_1 n(k-1) - W_2 n(k-2) \ldots - W_N n(k-N))^2$$

includes:
correlating n(k)=XI(k)−d(k) of the second signals XI(k), to obtain a correlation matrix $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix},$$

where R is an autocorrelation function of the noise n(k), the correlation matrix has a dimension of (N+1)*(N+1), and N+1 is a length of a filter; and obtaining $$\begin{bmatrix} \tilde{W}_0 \\ \tilde{W}_1 \\ \vdots \\ \tilde{W}_N \end{bmatrix}$$

according to $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

and normalizing $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and determining the filtering coefficients $W_0$, $W_1$, $W_2$, ..., and $W_N$ according to the values of $$\begin{bmatrix} W_0 \\ W_1 \\ \vdots \\ W_N \end{bmatrix}.$$

According to a second aspect of the present invention, a tunnel processing method is provided, including:

a processor, configured to sequentially preprocess a first signal received by a receiver to obtain to-be-processed second signals;

a calculator, configured to generate filtering coefficients for the second signals by converting colored noise of the second signals into white noise; and a filter, configured to filter the corresponding second signals according to the filtering coefficients.

In a first possible implementation manner, according to the second aspect, the calculator is specifically configured to: if data of the second signals is marked as XI(k), original sending data of the second signals XI(k) is marked as d(k), the colored noise of the second signals XI(k) is marked as n(k), and n(k)=XI(k)−d(k), obtain filtering coefficients $W_0$, $W_1$, $W_2$ ... $W_N$ according to $$\min_{W_0, W_1, W_2 \ldots W_N} (n(k) = W_0 n(k) - W_1 n(k-1) - W_2 n(k-2) \ldots - W_N n(k-N))^2,$$

where N is a quantity of filter taps, N is a nonnegative integer, and k corresponds to a time serial number of the second signals.

In a second possible implementation manner, according to the first possible implementation manner, the calculator is specifically configured to: correlate n(k)= XI(k)−d(k) of the second signals XI(k), to obtain a correlation matrix $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix}$$

where R is an autocorrelation function of the noise n(k), the correlation matrix has a dimension of (N+1)*(N+1), and N+1 is a length of a filter, and obtain $$\begin{bmatrix} \tilde{W}_0 \\ \tilde{W}_1 \\ \vdots \\ \tilde{W}_N \end{bmatrix}$$

according to $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

normalize $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and determine the filtering coefficients $W_0$, $W_1$, $W_2$, ..., and $W_N$ according to the values of $$\begin{bmatrix} W_0 \\ W_1 \\ \vdots \\ W_N \end{bmatrix}.$$

According to a third aspect of the present invention, a receiver is provided, including:
- a processing module, configured to sequentially preprocess a first signal received by a receiving module to obtain to-be-processed second signals;
- a filtering coefficient generation module, configured to generate filtering coefficients for the second signals by converting colored noise of the second signals into white noise; and
- a filtering module, configured to filter the corresponding second signals according to the filtering coefficients.

In a first possible implementation manner, according to the third aspect,
the filtering coefficient generation module is specifically configured to: if data of the second signals is marked as XI(k), original sending data of the second signals XI(k) is marked as d(k), the colored noise of the second signals XI(k) is marked as n(k), and n(k)=XI(k)−d(k), obtain filtering coefficients $W_0, W_1, W_2 \ldots W_N$ according to $$\min_{W_0, W_1, W_2 \ldots W_N} (n(k) = W_0 n(k) - W_1 n(k-1) - W_2 n(k-2) \ldots - W_N n(k-N))^2,$$

where N is a quantity of taps of the filtering module, N is a nonnegative integer, and k corresponds to a time serial number of the second signal.

In a second possible implementation manner, according to the first possible implementation manner,
the filtering coefficient generation module is specifically configured to: correlate n(k)=XI(k)−d(k) of the second signals XI(k), to obtain a correlation matrix $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix}$$

where R is an autocorrelation function of the noise n(k), the correlation matrix has a dimension of (N+1)*(N+1), and N+1 is a length of the filtering module; and obtain $$\begin{bmatrix} \tilde{W}_0 \\ \tilde{W}_1 \\ \vdots \\ \tilde{W}_N \end{bmatrix}$$

according to $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

normalize $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and determine the filtering coefficients $W_0, W_1, W_2, \ldots, W_N$ according to the values of $$\begin{bmatrix} W_0 \\ W_1 \\ \vdots \\ W_N \end{bmatrix}.$$

According to the signal receiving method and the receiver provided in the embodiments of the present invention, a receiver sequentially preprocesses a received first signal to obtain to-be-processed second signals, generates filtering coefficients for the second signals by converting colored noise of the second signals into white noise, and filters the corresponding second signals according to the filtering coefficients. In this way, during filtering, the receiver can perform filtering by using filtering coefficients that are generated by performing noise reduction to change colored noise into white noise, and a coefficient of a filter for performing noise reduction to change colored noise into white noise varies with different channel conditions and different transmission requirements. Therefore, by means of the method provided in this disclosure, filter coefficients can be extracted automatically to adapt to impact caused by different channel conditions and different transmission requirements, thereby improving accuracy of filtering. In this way, subsequently when a sequence detector is used for reception, system performance of the receiver can be improved, thereby achieving an optimal receiving function of the receiver.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
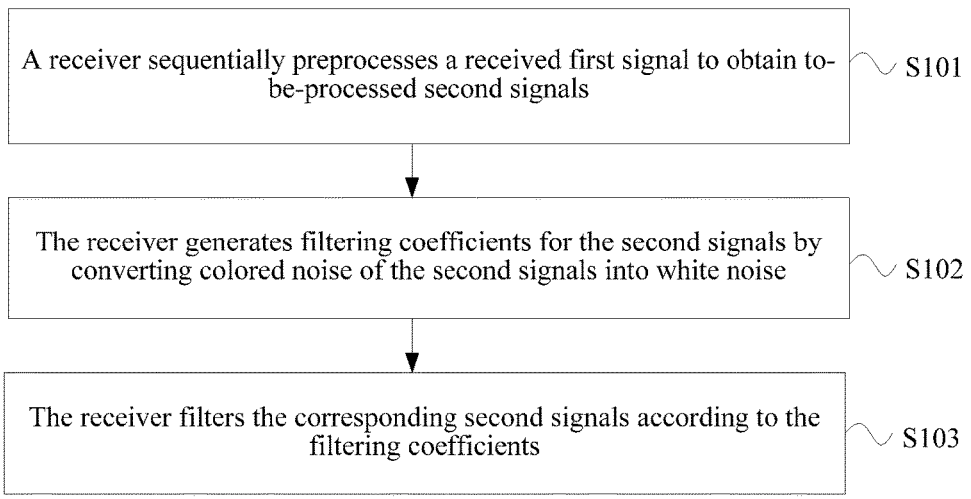
FIG. 1 is a schematic flowchart of a signal receiving method according to an embodiment of the present invention.

FIG. 1 is a schematic flowchart of a signal receiving method according to an embodiment of the present invention. As shown in FIG. 1, the method includes:

S101: A receiver sequentially preprocesses a received first signal to obtain to-be-processed second signals.

The first signal is a digital signal received by the receiver, and the second signals are signals obtained after the digital signal is preprocessed.

The preprocessing is to restore an original sending signal. Using a polarization multiplexing coherent receiver as an example, the preprocessing may include dispersion compensation, depolarization multiplexing, phase retrieval and the like, and the receiver may sequentially perform the foregoing processing on the received first signal to obtain multiple second signals. In an existing system, generally, a receiver usually obtains four second signals, but the present invention is not limited thereto.

Further, this receiver not only can receive a first signal sent by a transmitter in a conventional polarization multiplexing coherent receiving system, but also can receive a first signal sent by a transmitter additionally provided with pre-coding compared with a transmitter in a conventional polarization multiplexing coherent receiving system. The transmitter additionally provided with pre-coding can compress bandwidth of a signal to obtain optimal signal shaping for corresponding system bandwidth.

A signal received by the receiver is split into two signals, X/Y signals, by using a polarization splitter, the X/Y signals are respectively input to two 90-degree mixers, and the signals are moved to a baseband by using a local laser signal beat frequency. Electrical signals received by four photoelectric detectors are passed through four analog-to-digital converters to obtain four digital signals, respectively marked as XI, XQ, YI and YQ. XI, XQ, YI and YQ may be respectively input to two dispersion compensation modules, with XI/XQ as one channel and YI/YQ as another channel, and output complex signals together are input to a polarization compensation module for polarization compensation, two output complex signals are respectively input to two phase retrieval modules, and the two phase retrieval modules respectively output four signals including real part signals and imaginary part signals, respectively marked as a second signal XI, a second signal XQ, a second signal YI, and a second signal YQ.

S102: The receiver generates filtering coefficients for the second signals by converting colored noise of the second signals into white noise.

Further, using one channel marked as XI(k) in data of the second signals as an example for description, data of the second signals is marked as XQ(k), YI(k), and YQ(k), corresponding filtering coefficients are calculated by analogy by using this method, and details are not be described herein again.

Figure 2:
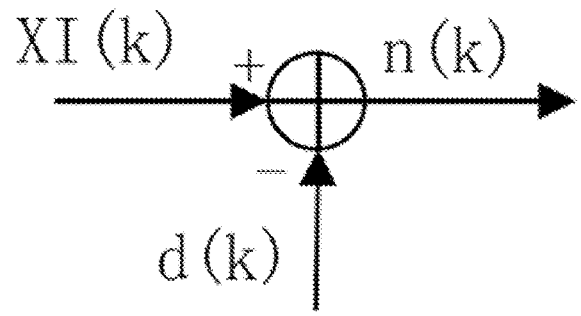
FIG. 2 is a schematic diagram of noise estimation according to an embodiment of the present invention.

Original sending data of the second signals XI(k) is marked as d(k), and the colored noise of the second signals XI(k) is marked as n(k). FIG. 2 is a schematic diagram of noise estimation according to an embodiment of the present invention. As shown in FIG. 2, a relationship between the original sending data marked as d(k) of the second signals XI(k), the colored noise marked as n(k) of the second signals XI(k), and the second signals XI(k) are represented by a formula (1).

$$n(k)=XI(k)-d(k) \quad (1)$$

The original sending data d(k) may be obtained according to a training sequence or a decision feedback.

It should be noted that optimal receiving performance can be achieved by performing noise reduction to change colored noise into white noise in combination with a sequence detection method. Affected by channel conditions and transmission requirements, a power spectrum of the colored noise obtained by calculation each time varies, and a corresponding whitening filter varies. Using a post-filter having variable coefficients can automatically adapt to different channel conditions and transmission requirements, thereby improving accuracy of restored data.

For example, the generating filtering coefficients for the second signals by converting colored noise into white noise may be calculating filtering coefficients according to a function (2).

$$\min_{w_0, w_1, w_2, \ldots, w_N} (n(k) - W_0 n(k) - W_1 n(k-1) - W_2 n(k-2) \ldots - W_N n(k-N))^2 \quad (2)$$

N is a quantity of filter taps, N is a nonnegative integer, and k corresponds to a time serial number of the second signal. The filtering coefficients are finite impulse response filtering coefficients.

Figure 3:
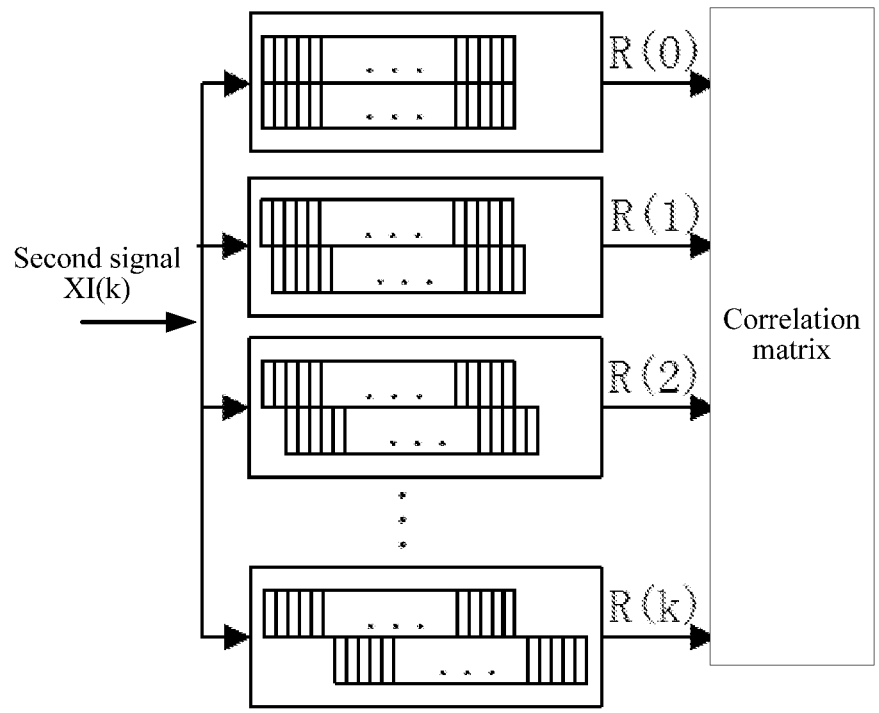
FIG. 3 is a schematic diagram of obtaining a correlation matrix according to an embodiment of the present invention.

Further, the filtering coefficients in the function (2) may be calculated by using a correlation matrix. FIG. 3 is a schematic diagram of obtaining a correlation matrix according to an embodiment of the present invention. As shown in FIG. 3, colored noise is correlated to obtain a correlation matrix:

$$\begin{bmatrix} R(0) & R(1) & \ldots & R(N) \\ R(1) & R(0) & \ldots & R(N-1) \\ \vdots & \vdots & & \vdots \\ R(N) & R(N-1) & \ldots & R(0) \end{bmatrix} \quad (3)$$

R is an autocorrelation function of n(k), the correlation matrix has a dimension of (N+1)*(N+1), N+1 is a length of a filter, and the filter is configured to perform whitening and noise reduction.

For purpose of noise whitening, the correlation matrix and the filtering coefficients should satisfy a formula (4).

$$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix} \quad (4)$$

The formula (4) is inversed to obtain $$\begin{bmatrix} \tilde{W}_0 \\ \tilde{W}_1 \\ \vdots \\ \tilde{W}_N \end{bmatrix} = \begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix}^{-1} \begin{bmatrix} R(0) \\ 0 \\ \vdots \\ 0 \end{bmatrix}.$$

Then, $$\begin{bmatrix} \tilde{W}_0 \\ \tilde{W}_1 \\ \vdots \\ \tilde{W}_N \end{bmatrix}$$

is normalized to obtain $$\begin{bmatrix} W_0 \\ W_1 \\ \vdots \\ W_N \end{bmatrix} = \begin{bmatrix} 1 \\ \tilde{W}_1/\tilde{W}_0 \\ \vdots \\ \tilde{W}_N/\tilde{W}_0 \end{bmatrix}.$$

Finally, filtering coefficients $W_0, W_1, W_2 \ldots W_N$ are determined by using numerical values that satisfy $$\begin{bmatrix} \tilde{W}_0 \\ \tilde{W}_1 \\ \vdots \\ \tilde{W}_N \end{bmatrix}.$$

S103: The receiver filters the corresponding second signals according to the filtering coefficients.

For example, when $W_L, W_{L+1} \ldots W_N$ the filtering coefficients $W_0, W_1, W_2 \ldots W_N$ are all less than a preset threshold, filtering is performed according to the second signals that correspond to the first L coefficients $W_0, W_1, \ldots W_{L-1}$ in the filtering coefficients, where 0<L<N. That is, the quantity of filter taps is variable. If a filter originally has N original taps, N>10, but 10 to N corresponding to the calculated 10 to N are all less than the preset threshold, the quantity of filter taps is 10. The preset threshold may be any value, for example, 0.01.

According to the receiver provided in this embodiment of the present invention, a receiver sequentially preprocesses a received first signal to obtain to-be-processed second signals, generates filtering coefficients for the second signals by converting colored noise of the second signals into white noise, and filters the corresponding second signals according to the filtering coefficients. In this way, during filtering, the receiver can perform filtering by using filtering coefficients that are generated by performing noise reduction to change colored noise into white noise, and a coefficient of a filter for performing noise reduction to change colored noise into white noise varies with different channel conditions and different transmission requirements. Therefore, by means of the method provided in this disclosure, filter coefficients can be extracted automatically to adapt to impact caused by different channel conditions and different transmission requirements, thereby improving accuracy of filtering. In this way, subsequently when a sequence detector is used for reception, system performance of the receiver can be improved, thereby achieving an optimal receiving function of the receiver.

Figure 4:
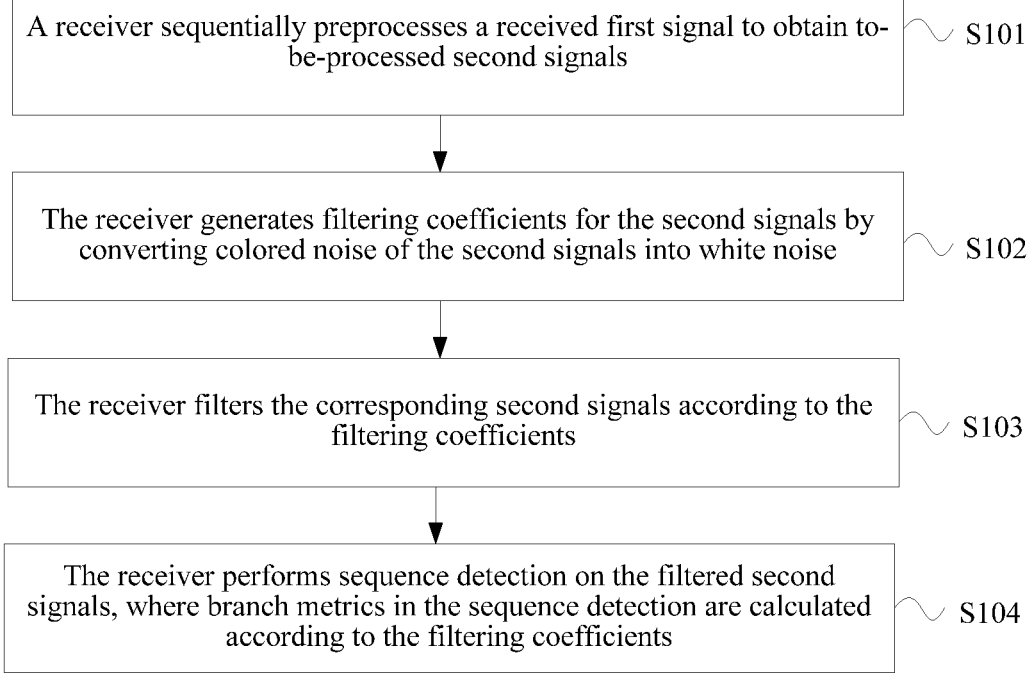
FIG. 4 is a schematic flowchart of another signal receiving method according to an embodiment of the present invention.

Further, FIG. 4 is a schematic flowchart of another signal receiving method according to an embodiment of the present invention. As shown in FIG. 2, the method differs from FIG. 1 in that after S103, the method further includes:

S104: The receiver performs sequence detection on the filtered second signals, where branch metrics in the sequence detection are calculated according to the filtering coefficients.

It should be noted that in the receiver, the signals filtered by the filter, such as an FIR filter, may be further passed through four sequence detection modules for sequence detection respectively, and finally output to forward error correction, to obtain final data.

Further, the sequence detection may be performed on the filtered second signals by using a maximum likelihood sequence detection MLSD algorithm or a BCJR algorithm, where branch metrics in the sequence detection are calculated according to the filtering coefficients.

For example, if $W_L, W_{L+1} \ldots W_N$ in the filtering coefficients $W_0, W_1, W_2 \ldots W_N$ are all less than the preset threshold, where 0<L<N, a post-filter performs filtering by using $W_0, W_1, \ldots W_{L-1}$, correspondingly, the branch metrics in the sequence detection are calculated by using $W_0, W_1 \ldots W_L$. A rule for selecting a filtering coefficient is as described above, and details are not described herein again.

Figure 5:
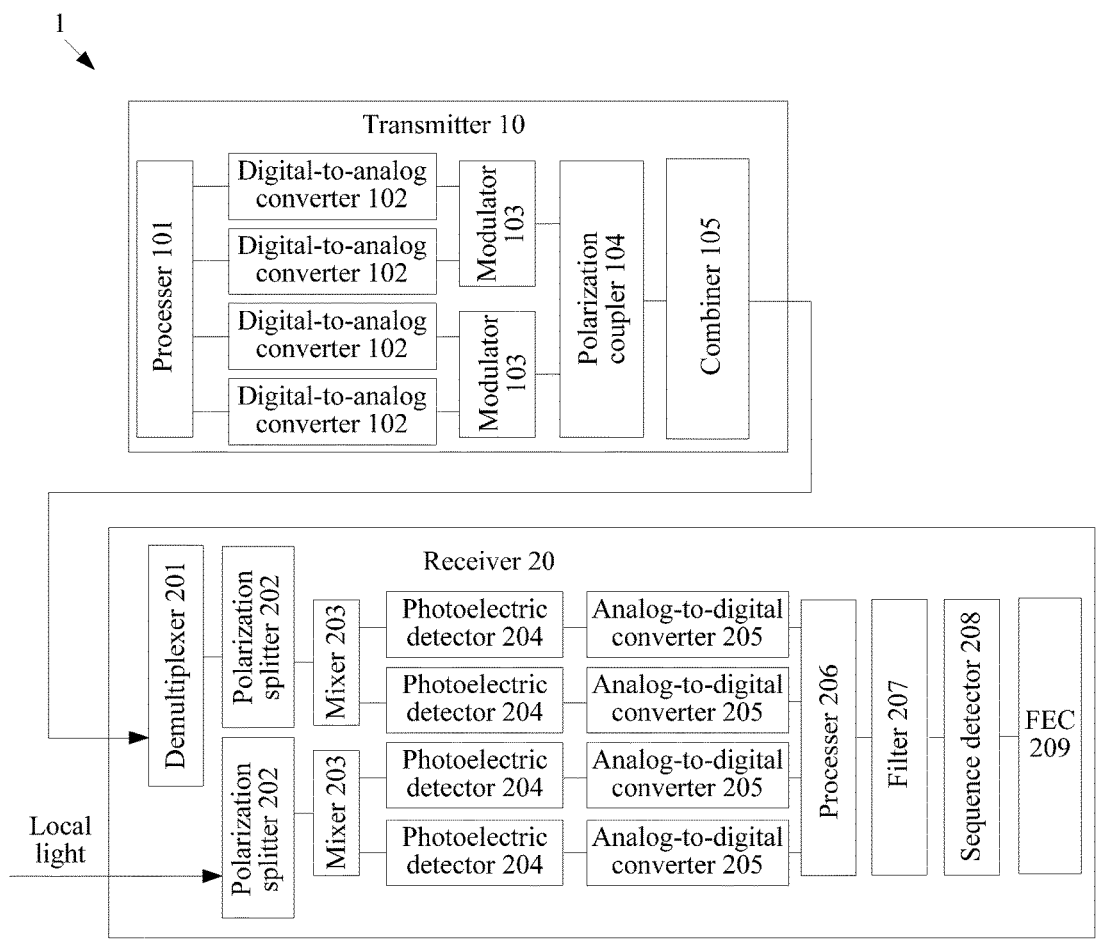
FIG. 5 is a schematic structural diagram of a system according to an embodiment of the present invention.

It should be noted that, the foregoing method is applicable to a system provided in FIG. 5. FIG. 5 is a schematic structural diagram of a system according to an embodiment of the present invention. As shown in FIG. 5, a system 1 includes a transmitter 10 and a receiver 20. The transmitter 10 includes a processor 101, a digital-to-analog converter 102, a modulator 103, a polarization coupler 104, and a combiner 105 that are connected in sequence. The receiver 20 includes a demultiplexer 201, a polarization splitter 202, a mixer 203, a photoelectric detector 204, an analog-to-digital converter 205, a processor 206, a filter 207, a sequence detector 208, and forward error correction FEC (Forward Error Correction, FEC) 209.

The first signal provided in the foregoing method may be formed by the transmitter 1 by converting a broadband digital signal into a narrowband digital signal by using the filter. First, the transmitter 1 performs constellation mapping, and performs prefiltering prefilter based on baud-rate constellation mapping points. For a baud rate signal, the transmitter 1 narrows the broadband signal, and then performs waveform forming and transmit-end impairment compensation and the like. For example, narrowband digital signals of four channels are obtained after processing by the processor 101. The narrowband digital signals of the four channels are respectively input to four digital-to-analog converters 103. The digital-to-analog converters 103 respectively perform digital-to-analog conversion on the narrowband digital signals of the four channels to convert the narrowband digital signals into analog signals IX, QX, TY, and QY. Then, IX and QX are transmitted to a first modulator 103 for modulation to obtain a high-frequency first modulated signal, and TY and QY are transmitted to a second modulator 103 for modulation to obtain a high-frequency second modulated signal. Then, the first modulated signal and the second modulated signal are sent to the polarization coupler 104 and coupled into one signal, which is sent to the combiner 105 and coupled with a signal of another channel, and a coupled signal is input to a delivery fiber, and sent to the receiver 2 as the first signal.

Because the transmitter 1 converts a broadband digital signal into a narrowband digital signal by using the processor 101 so that the narrowband digital signal can successfully pass through the narrowband digital-to-analog converter 102, signal impairment caused by insufficient device bandwidth can be reduced.

After receiving the first signal, the receiver 20 may demultiplex the received first signal, that is, an optical signal, to obtain an optical signal by using a demultiplexer 201. One optical signal is split into a first depolarization signal and a second depolarization signal by a polarization splitter 202. An input signal of another second polarization splitter is local light. The first depolarization signal is input into a mixer 203, and the second depolarization signal is input into another mixer 203. Each mixer 203 outputs a signal obtained after mixing, to two photoelectric detectors 204, and the photoelectric detectors 204 restore the input signal into a low-frequency baseband electrical signal. Then, the analog-to-digital converter 205 performs analog-to-digital conversion to convert the low-frequency baseband electrical signal into a digital signal. Finally, the processor 206 performs balancing (including dispersion compensation and polarization compensation) and phase retrieval to obtain second signals. Then, the filter 207 performs post-filtering on the second signals, where the post-filtering is finite impulse response filtering. After the filtering, the sequence detector 208 performs sequence detection on the second signals, and the FEC 209 performs forward error correction.

In the foregoing solution, white noise of a transmitted signal superposed on a channel is amplified by channel equalization, and is suppressed after post-filtering. On one hand, the receiver 20 filters noise by means of post-filtering, and at the same time, introduces controllable inter-symbol interference (Inter-Symbol Interference, ISI), and then performs sequence detection. Moreover, the inter-symbol interference introduced by post-filtering is controllable, and impact of inter-symbol interference can be eliminated by using sequence detection in the receiver, thereby improving system performance.

Based on the above, the receiver can perform filtering by using filtering coefficients that are generated by performing noise reduction to change colored noise into white noise, and further perform sequence detection, thereby improving overall system performance. A coefficient of a filter for performing noise reduction to change colored noise into white noise varies with different channel conditions and different transmission requirements. Therefore, by means of the method provided in this disclosure, filter coefficients can be extracted automatically to adapt to impact caused by different channel conditions and different transmission requirements, thereby improving accuracy of filtering. In this way, subsequently when a sequence detector is used for reception, system performance of the receiver can be improved, thereby achieving an optimal receiving function of the receiver.

Figure 6:
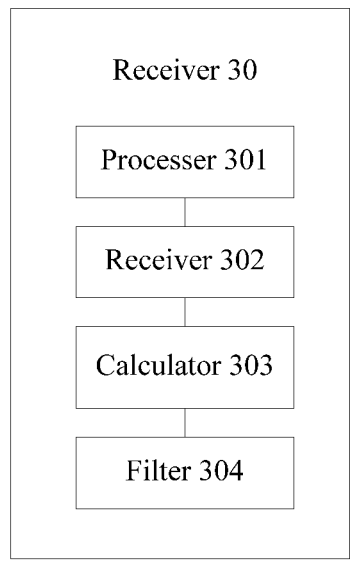
FIG. 6 is a schematic structural diagram of a receiver according to an embodiment of the present invention.

FIG. 6 is a schematic structural diagram of a receiver according to an embodiment of the present invention. As shown in FIG. 6, a receiver 30 includes: a processor 301, a receiver 302, a calculator 303, and a filter 304. The receiver 30 may be applied to the system 1 provided in the FIG. 5. The processor 301 of the receiver 30 may include the demultiplexer 201, the polarization splitter 202, the mixer 203, the photoelectric detector 204, and the analog-to-digital converter 205 in the receiver 20 provided in FIG. 5. Alternatively, the processor 301 may have functions of a demultiplexer, a polarization splitter, a mixer, a photoelectric detector, and an analog-to-digital converter.

The processor 301 is configured to sequentially preprocess a first signal received by the receiver 302 to obtain to-be-processed second signals.

The calculator 303 is configured to generate filtering coefficients for the second signals by converting colored noise of the second signals into white noise.

For example, the calculator 303 may be configured to: if data of the second signals is marked as XI(k), original sending data of the second signals XI(k) is marked as d(k), the colored noise of the second signals XI(k) is marked as n(k), and n(k)=XI(k)−d(k), obtain filtering coefficients $W_0$, $W_1$, $W_2$ ... $W_N$, according to $$\min_{W_0,W_1,W_2,\ldots,W_N} (n(k) - W_0 n(k) - W_1 n(k-1) - W_2 n(k-2) \ldots - W_N n(k-N))^2,$$

where N is a quantity of filter taps, N is a nonnegative integer, and k corresponds to a time serial number of the second signal.

Further, the calculator 303 may first correlate n(k)=XI(k)−d(k) of the second signals XI(k) to obtain a correlation matrix $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix},$$

where R is an autocorrelation function of the noise n(k), the correlation matrix has a dimension of (N+1)*(N+1), and N+1 is a length of a filter; and obtain $$\begin{bmatrix} \tilde{W}_0 \\ \tilde{W}_1 \\ \vdots \\ \tilde{W}_N \end{bmatrix}$$

according to $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

then normalize $$\begin{bmatrix} W_0 \\ W_1 \\ \vdots \\ W_N \end{bmatrix}$$

to obtain values of $$\begin{bmatrix} W_0 \\ W_1 \\ \vdots \\ W_N \end{bmatrix},$$

and finally determine the filtering coefficients $W_0$, $W_1$, $W_2$, ..., and $W_N$ according to the values of $$\begin{bmatrix} W_0 \\ W_1 \\ \vdots \\ W_N \end{bmatrix}.$$

The filter 304 is configured to filter the corresponding second signals according to the filtering coefficients.

For example, the filter 304 is configured to filter the corresponding second signals according to $W_0$, $W_1$, ... $W_{L-1}$ in the filtering coefficients if $W_L$, $W_{L+1}$ ... $W_N$ in the filtering coefficients $W_0$, $W_1$, $W_2$ ... $W_N$ are all less than a preset threshold, where 0<L<N.

Further, the processor 301 is further configured to perform sequence detection on the filtered second signals by using a maximum likelihood sequence detection MLSD algorithm or a BCJR algorithm. The processor 301 may be a digital processing chip. In a sequence detection algorithm of the sequence detection, calculation of corresponding branch metrics may be based on the filtering coefficients calculated above.

For example, if the processor determines that $W_L$, $W_{L+1}$ ... $W_N$ in the filtering coefficients $W_0$, $W_1$, $W_2$ ... $W_N$ are all less than the preset threshold, where 0<L<N, a post-filter performs filtering by using $W_0$, $W_1$, ... $W_{L-1}$, and correspondingly the branch metrics are calculated according to $W_0$, $W_1$, ... $W_{L-1}$ in the filtering coefficients.

The receiver 30 of this embodiment may be configured to perform the technical solution of the method embodiment shown in FIG. 1 or FIG. 4, and applied to the system provided in FIG. 5. Their implementation principles and technical effects are similar, and details are not described herein again.

According to the receiver provided in this embodiment of the present invention, the receiver sequentially preprocesses a received first signal to obtain to-be-processed second signals, generates filtering coefficients for the second signals by converting colored noise of the second signals into white noise, and filters the corresponding second signals according to the filtering coefficients. In this way, during filtering, the receiver can perform filtering by using filtering coefficients that are generated by performing noise reduction to change colored noise into white noise, and a coefficient of a filter for performing noise reduction to change colored noise into white noise varies with different channel conditions and different transmission requirements. Therefore, by means of the method provided in this disclosure, filter coefficients can be extracted automatically to adapt to impact caused by different channel conditions and different transmission requirements, thereby improving accuracy of filtering. In this way, subsequently when a sequence detector is used for reception, system performance of the receiver can be improved, thereby achieving an optimal receiving function of the receiver.

Figure 7:
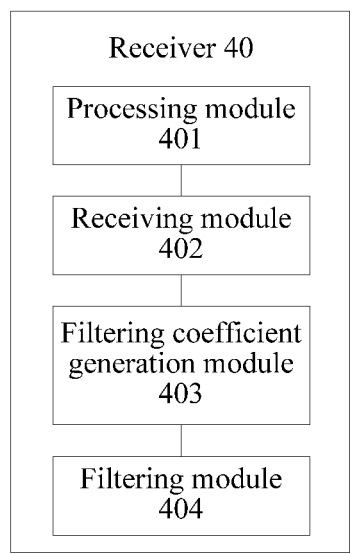
FIG. 7 is a schematic structural diagram of another receiver according to an embodiment of the present invention.

FIG. 7 is a schematic structural diagram of a receiver according to another embodiment of the present invention. As shown in FIG. 7, a receiver 40 includes: a processing module 401, a receiving module 402, a filtering coefficient generation module 403, and a filtering module 404. The receiver 40 may be applied to the system 1 provided in FIG. 5. The processing module 401 of the receiver 40 may have functions of a demultiplexer, a polarization splitter, a mixer, a photoelectric detector, and an analog-to-digital converter.

The processing module 401 is configured to sequentially preprocess a first signal received by the receiving module 402 to obtain to-be-processed second signals.

The filtering coefficient generation module 403 is configured to generate filtering coefficients for the second signals by converting colored noise of the second signals into white noise.

For example, the filtering coefficient generation module 403 may be configured to: if data of the second signals is marked as XI(k), original sending data of the second signals XI(k) is marked as d(k), the colored noise of the second signals XI(k) is marked as n(k), and n(k)=XI(k)−d(k), obtain filtering coefficients $W_0$, $W_1$, $W_2$ ... $W_N$ according to $$\min_{W_0, W_1, W_2 \ldots W_N} (n(k) - W_0 n(k) - W_1 n(k-1) - W_2 n(k-2) \ldots - W_N n(k-N))^2,$$

where N is a quantity of taps of the filtering module, N is a nonnegative integer, and k corresponds to a time serial number of the second signal.

Further, the filtering coefficient generation module 403 may first correlate n(k)=XI(k)−d(k) of the second signals XI(k), to obtain a correlation matrix $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix},$$

where R is an autocorrelation function of the noise n(k), the correlation matrix has a dimension of (N+1)*(N+1), and N+1 is a length of the filtering module; and obtain $$\begin{bmatrix} \tilde{W}_0 \\ \tilde{W}_1 \\ \vdots \\ \tilde{W}_N \end{bmatrix}$$

according to $$\begin{bmatrix} R(0) & R(1) & \dots & R(N) \\ R(1) & R(0) & \dots & R(N-1) \\ \vdots & \vdots & \ddots & \vdots \\ R(N) & R(N-1) & \dots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

then normalize $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and finally determine the filtering coefficients $W_0$, $W_1$, $W_2$ ... $W_N$ according to the values of $$\begin{bmatrix} W_0 \\ W_1 \\ \vdots \\ W_N \end{bmatrix}.$$

The filter 403 is configured to filter the corresponding second signals according to the filtering coefficients.

For example, the filter module 403 may be configured to filter the corresponding second signals according to $W_0$, $W_1$, ... $W_{L-1}$ in the filtering coefficients if $W_L$, $W_{L+1}$ ... $W_N$ in the filtering coefficients $W_0$, $W_1$, $W_2$ ... $W_N$ are all less than a preset threshold, where 0<L<N.

Figure 8:
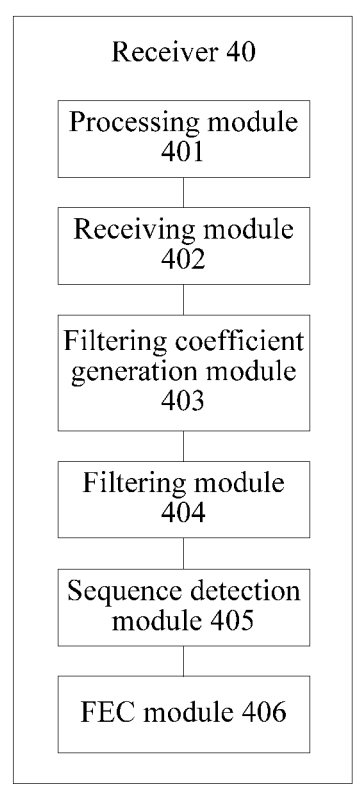
FIG. 8 is a schematic structural diagram of a receiver according to another embodiment of the present invention.

Further, FIG. 8 is a schematic structural diagram of another receiver according to an embodiment of the present invention. As shown in FIG. 8, the receiver 40 further includes a sequence detection module 405 and an FEC module 406.

The sequence detection module 405 may be configured to perform sequence detection on the filtered second signals by using a maximum likelihood sequence detection MLSD algorithm or a BCJR algorithm. In a sequence detection algorithm of the sequence detection, calculation of corresponding branch metrics may be based on the filtering coefficients calculated above.

For example, the sequence detection module 405 may be configured so that if $W_L$, $W_{L+1}$ ... $W_N$ in the filtering coefficients $W_0$, $W_1$, $W_2$ ... $W_N$ are all less than the preset threshold, where 0<L<N, a post-filter performs filtering by using $W_0$, $W_1$, ... $W_{L-1}$, and branch metrics in a corresponding sequence detector are calculated based on $W_0$, $W_1$, ... $W_{L-1}$. The receiver 40 of this embodiment may be configured to perform the technical solution of the method embodiment shown in FIG. 1 or FIG. 4, and applied to the system provided in FIG. 5. Their implementation principles and technical effects are similar, and details are not described herein again.

According to the receiver provided in this embodiment of the present invention, the receiver sequentially preprocesses a received first signal to obtain to-be-processed second signals, generates filtering coefficients for the second signals by converting colored noise of the second signals into white noise, and filters the corresponding second signals according to the filtering coefficients. In this way, during filtering, the receiver can perform filtering by using filtering coefficients that are generated by performing noise reduction to change colored noise into white noise, and a coefficient of a filter for performing noise reduction to change colored noise into white noise varies with different channel conditions and different transmission requirements. Therefore, by means of the method provided in this disclosure, filter coefficients can be extracted automatically to adapt to impact caused by different channel conditions and different transmission requirements, thereby improving accuracy of filtering. In this way, subsequently when a sequence detector is used for reception, system performance of the receiver can be improved, thereby achieving an optimal receiving function of the receiver.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal receiving method, comprising:
sequentially preprocessing a received first signal to obtain to-be-processed second signals;
generating filtering coefficients for the second signals by converting colored noise of the second signals into white noise; and
filtering the corresponding second signals according to the filtering coefficients, wherein the generating filtering coefficients for the second signals by converting colored noise of the second signals into white noise comprises:
if data of the second signals is marked as XI(k), original sending data of the second signals XI(k) is marked as d(k), the colored noise of the second signals XI(k) is marked as n(k), and n(k)=XI(k)−d(k), obtaining filtering coefficients $W_0$, $W_1$, $W_2$ ... $W_N$ according to $$\min_{W_0, W_1, W_2 \dots W_N} (n(k) - W_0 n(k) - W_1 n(k-1) - W_2 n(k-2) \dots - W_N n(k-N))^2,$$

wherein N is a quantity of filter taps, N is a nonnegative integer, and k corresponds to a time serial number of the second signal.

2. The method according to claim 1, wherein
the obtaining filtering coefficients $W_0, W_1, W_2 \ldots W_N$ according to $$\min_{W_0, W_1, W_2 \ldots W_N} (n(k) - W_0 n(k) - W_1 n(k-1) - W_2 n(k-2) \ldots - W_N n(k-N))^2$$

comprises:

correlating $n(k)=XI(k)-d(k)$ of the second signals $XI(k)$ to obtain a correlation matrix $$\begin{bmatrix} R(0) & R(1)\ldots & R(N) \\ R(1) & R(0)\ldots & R(N-1) \\ \vdots & \vdots & \ddots \\ R(N) & R(N-1)\ldots & R(0) \end{bmatrix},$$

wherein R is an autocorrelation function of the noise $n(k)$, the correlation matrix has a dimension of $(N+1)*(N+1)$, and $N+1$ is a length of a filter; and obtaining $$\begin{bmatrix} \tilde{W}_0 \\ \tilde{W}_1 \\ \vdots \\ \tilde{W}_N \end{bmatrix}$$

according to $$\begin{bmatrix} R(0) & R(1)\ldots & R(N) \\ R(1) & R(0)\ldots & R(N-1) \\ \vdots & \vdots & \ddots \\ R(N) & R(N-1)\ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

and normalizing $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and determining the filtering coefficients $W_0, W_1, W_2, \ldots,$ and $W_N$ according to the values of $$\begin{bmatrix} W_0 \\ W_1 \\ \vdots \\ W_N \end{bmatrix}.$$

3. The method according to claim 1, wherein the original sending data is obtained according to a training sequence or a decision feedback.

4. A signal receiving method, comprising:
sequentially preprocessing a received first signal to obtain to-be-processed second signals;
generating filtering coefficients for the second signals by converting colored noise of the second signals into white noise; and
filtering the corresponding second signals according to the filtering coefficients, wherein $W_L, W_{L+1} \ldots W_N$ in the filtering coefficients $W_0, W_1, W_2 \ldots W_N$ are all less than a preset threshold, wherein $0<L<N$; and
the filtering the corresponding second signals according to the filtering coefficients comprises:
filtering the corresponding second signals according to $W_0, W_1, \ldots W_{L-1}$ in the filtering coefficients.

5. The method according to claim 4, wherein the filtering coefficients are finite impulse response FIR filtering coefficients.

6. A signal receiving method, comprising:
sequentially preprocessing a received first signal to obtain to-be-processed second signals;
generating filtering coefficients for the second signals by converting colored noise of the second signals into white noise; and
filtering the corresponding second signals according to the filtering coefficients, wherein after the filtering the corresponding second signals according to the filtering coefficients, the method further comprises:
performing sequence detection on the filtered second signals by using a maximum likelihood sequence detection (MLSD) algorithm or a BCJR algorithm, wherein branch metrics in the sequence detection are calculated according to the filtering coefficients.

7. The method according to claim 6, wherein
$W_L, W_{L+1} \ldots W_N$ in the filtering coefficients $W_0, W_1, W_2 \ldots W_N$ are all less than the preset threshold, wherein $0<L<N$; and
the calculating branch metrics according to the filtering coefficients comprises:
calculating the branch metrics according to $W_0, W_1, \ldots W_{L-1}$ in the filtering coefficients.

8. A receiver, comprising:
a processor, configured to sequentially preprocess a received first signal to obtain to-be-processed second signals;
a calculator, configured to generate filtering coefficients for the second signals by converting colored noise of the second signals into white noise; and
a filter, configured to filter the corresponding second signals according to the filtering coefficients, wherein
the calculator is configured to: if data of the second signals is marked as $XI(k)$, original sending data of the second signals $XI(k)$ is marked as $d(k)$, the colored noise of the second signals $XI(k)$ is marked as $n(k)$, and $n(k)=XI(k)-d(k)$, obtain filtering coefficients $W_0, W_1, W_2 \ldots W_N$ according to $$\min_{W_0,W_1,W_2\ldots W_N} (n(k) - W_0 n(k) - W_1 n(k-1) - W_2 n(k-2) \ldots - W_N n(k-N))^2,$$

wherein N is a quantity of filter taps, N is a nonnegative integer, and k corresponds to a time serial number of the second signal.

9. The receiver according to claim 8, wherein
the calculator is configured to: correlate n(k)=XI(k)−d(k) of the second signals XI(k), to obtain a correlation matrix $$\begin{bmatrix} R(0) & R(1) \ldots & R(N) \\ R(1) & R(0) \ldots & R(N-1) \\ \vdots & \vdots & \ddots \\ R(N) & R(N-1) \ldots & R(0) \end{bmatrix},$$

wherein R is an autocorrelation function of the noise n(k), the correlation matrix has a dimension of (N+1)*(N+1), and N+1 is a length of a filter; and
obtain $$\begin{bmatrix} \tilde{W}_0 \\ \tilde{W}_1 \\ \vdots \\ \tilde{W}_N \end{bmatrix}$$

according to $$\begin{bmatrix} R(0) & R(1) \ldots & R(N) \\ R(1) & R(0) \ldots & R(N-1) \\ \vdots & \vdots & \ddots \\ R(N) & R(N-1) \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

normalize $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and determine the filtering coefficients $W_0, W_1, W_2, \ldots,$ and $W_N$ according to the values of $$\begin{bmatrix} W_0 \\ W_1 \\ \vdots \\ W_N \end{bmatrix}.$$

10. A receiver, comprising:
a processor, configured to sequentially preprocess a received first signal to obtain to-be-processed second signals;
a calculator, configured to generate filtering coefficients for the second signals by converting colored noise of the second signals into white noise; and
a filter, configured to filter the corresponding second signals according to the filtering coefficients, wherein
the filter is configured to filter the corresponding second signals according to $W_0, W_1, \ldots W_{L-1}$ in the filtering coefficients if the filtering coefficients $W_L, W_{L+1} W_N$ in $W_0, W_1, W_2 \ldots W_N$ are all less than a preset threshold, wherein 0<L<N.

11. A receiver, comprising:
a processor, configured to sequentially preprocess a received first signal to obtain to-be-processed second signals;
a calculator, configured to generate filtering coefficients for the second signals by converting colored noise of the second signals into white noise; and
a filter, configured to filter the corresponding second signals according to the filtering coefficients, wherein
the processor is further configured to perform sequence detection on the filtered second signals by using a maximum likelihood sequence detection MLSD algorithm or a BCJR algorithm, wherein branch metrics in the sequence detection are calculated according to the filtering coefficients.

12. The receiver according to claim 11, wherein
the processor is configured to calculate the branch metrics according to $W_0, W_1, \ldots W_{L-1}$ in the filtering coefficients if $W_L, W_{L+1} \ldots W_N$ in the filtering coefficients $W_0, W_1, W_2 \ldots W_N$ are all less than the preset threshold, wherein 0<L<N.

13. A receiver, comprising:
a processing module, configured to sequentially preprocess a first signal received by a receiving module to obtain to-be-processed second signals;
a filtering coefficient generation module, configured to generate filtering coefficients for the second signals by converting colored noise of the second signals into white noise; and
a filtering module, configured to filter the corresponding second signals according to the filtering coefficients, wherein
the filtering coefficient generation module is specifically configured to: if data of the second signals is marked as XI(k), original sending data of the second signals XI(k) is marked as d(k), the colored noise of the second signals XI(k) is marked as n(k), and n(k)=XI(k)−d(k), obtain filtering coefficients $W_0, W_1, W_2 \ldots W_N$ according to $$\min_{W_0,W_1,W_2\ldots W_N} (n(k) - W_0 n(k) - W_1 n(k-1) - W_2 n(k-2) \ldots - W_N n(k-N))^2,$$

wherein N is a quantity of taps of the filtering module, N is a nonnegative integer, and k corresponds to a time serial number of the second signal.

14. The receiver according to claim 13, wherein
the filtering coefficient generation module is configured to: correlate $n(k)=XI(k)-d(k)$ of the second signals $XI(k)$, to obtain a correlation matrix $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix},$$

wherein R is an autocorrelation function of the noise $n(k)$, the correlation matrix has a dimension of $(N+1)*(N+1)$, and $N+1$ is a length of the filtering module; and obtain $$\begin{bmatrix} \tilde{W}_0 \\ \tilde{W}_1 \\ \vdots \\ \tilde{W}_N \end{bmatrix}$$

according to $$\begin{bmatrix} R(0) & R(1) & \ldots & R(N) \\ R(1) & R(0) & \ldots & R(N-1) \\ \vdots & \vdots & \ddots & \vdots \\ R(N) & R(N-1) & \ldots & R(0) \end{bmatrix} \begin{bmatrix} \tilde{W}_0 \\ \tilde{W}_1 \\ \vdots \\ \tilde{W}_N \end{bmatrix} = \begin{bmatrix} R(0) \\ 0 \\ \vdots \\ 0 \end{bmatrix},$$

normalize $$\begin{bmatrix} \tilde{W}_0 \\ \tilde{W}_1 \\ \vdots \\ \tilde{W}_N \end{bmatrix}$$

to obtain values of $$\begin{bmatrix} W_0 \\ W_1 \\ \vdots \\ W_N \end{bmatrix},$$

and determine the filtering coefficients $W_0, W_1, W_2, \ldots,$ and $W_N$ according to the values of $$\begin{bmatrix} W_0 \\ W_1 \\ \vdots \\ W_N \end{bmatrix}.$$

15. A receiver, comprising:
a processing module, configured to sequentially preprocess a first signal received by a receiving module to obtain to-be-processed second signals;
a filtering coefficient generation module, configured to generate filtering coefficients for the second signals by converting colored noise of the second signals into white noise; and
a filtering module, configured to filter the corresponding second signals according to the filtering coefficients, wherein
the filtering module is configured to filter the corresponding second signals according to $W_0, W_1, \ldots W_{L-1}$ in the filtering coefficients if $W_L, W_{L+1} \ldots W_N$ in the filtering coefficients $W_0, W_1, W_2 \ldots W_N$ are all less than a preset threshold, wherein $0<L<N$.

16. A receiver, comprising:
a processing module, configured to sequentially preprocess a first signal received by a receiving module to obtain to-be-processed second signals;
a filtering coefficient generation module, configured to generate filtering coefficients for the second signals by converting colored noise of the second signals into white noise;
a filtering module, configured to filter the corresponding second signals according to the filtering coefficients; and
a sequence detection module, configured to perform sequence detection on the filtered second signals by using a maximum likelihood sequence detection MLSD algorithm or a BCJR algorithm, wherein branch metrics in the sequence detection are calculated according to the filtering coefficients.

17. The receiver according to claim 16, wherein
the sequence detection module is configured to calculate the branch metrics according to $W_0, W_1, \ldots W_{L-1}$ in the filtering coefficients if $W_L, W_{L+1} \ldots W_N$ in the filtering coefficients $W_0, W_1, W_2 \ldots W_N$ are all less than the preset threshold, wherein $0<L<N$.

\* \* \* \* \*